United States Patent
Otanez et al.

(10) Patent No.: US 8,915,074 B2
(45) Date of Patent: Dec. 23, 2014

(54) SYSTEM AND METHOD FOR DETERMINING ACCUMULATOR FILL

(75) Inventors: Paul G. Otanez, Troy, MI (US);
Shushan Bai, Ann Arbor, MI (US);
Vijay A. Neelakantan, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 589 days.

(21) Appl. No.: 13/315,059

(22) Filed: Dec. 8, 2011

(65) Prior Publication Data

US 2013/0145756 A1 Jun. 13, 2013

(51) Int. Cl.
*F16D 31/02* (2006.01)

(52) U.S. Cl.
USPC .............................................. 60/418; 60/327

(58) Field of Classification Search
USPC ................................ 60/327, 413, 418; 73/299
See application file for complete search history.

(56) References Cited

U.S. PATENT DOCUMENTS

2008/0060862 A1   3/2008   Schiele et al.

FOREIGN PATENT DOCUMENTS

DE    102006041899 A1    3/2008
WO    WO2007118500 A1    10/2007

*Primary Examiner* — Ned Landrum
*Assistant Examiner* — Logan Kraft

(57) ABSTRACT

A method for determining whether an accumulator is filled to a predetermined level with a hydraulic fluid includes commanding a current to a solenoid, providing pressurized hydraulic fluid to the accumulator, setting a timer to an initial value, incrementing the timer, determining if the timer is greater than a timer threshold value, measuring a current to the solenoid if the timer is greater than the timer threshold value, calculating a modified current as a function of the measured current, the timer value, and the commanded current, comparing the modified current to a threshold, and determining that the accumulator is filled to the predetermined level if the modified current is greater than the threshold.

18 Claims, 2 Drawing Sheets

SYSTEM AND METHOD FOR DETERMINING ACCUMULATOR FILL

FIELD

The present disclosure relates to a system and method for determining an accumulator fill state, and more particularly to a system and method for determining an accumulator fill state using measured current in a solenoid.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

In certain hydraulic control systems an accumulator is used to augment or in some cases replace the pump as the source of pressurized hydraulic fluid. Accordingly, the charge state of the accumulator is critical to properly controlling the transmission. While pressure sensors may be employed to determine the pressure of the hydraulic fluid within the accumulator, and therefore its charge state, there is room in the art for a method of determining the charge state of an accumulator that minimizes the use of additional components and sensors.

SUMMARY

A method for determining whether an accumulator is filled to a predetermined level with a hydraulic fluid is provided. The accumulator is in fluid communication with at least one solenoid. The method includes the steps of commanding a current to the solenoid, providing pressurized hydraulic fluid to the accumulator, setting a timer to an initial value, incrementing the timer, determining if the timer is greater than a timer threshold value, measuring a current to the solenoid if the timer is greater than the timer threshold value, calculating a modified current as a function of the measured current, the timer value, and the commanded current, comparing the modified current to a threshold, and determining that the accumulator is filled to the predetermined level if the modified current is greater than the threshold.

In one aspect, the method further includes the step of comprising filtering the measured current.

In another aspect, calculating the modified current includes calculating a rate of change of the measured current over time.

In yet another aspect, calculating the modified current includes calculating a magnitude of change in the measured current over time.

In yet another aspect, calculating the modified current includes calculating a running average of the measured current over time.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
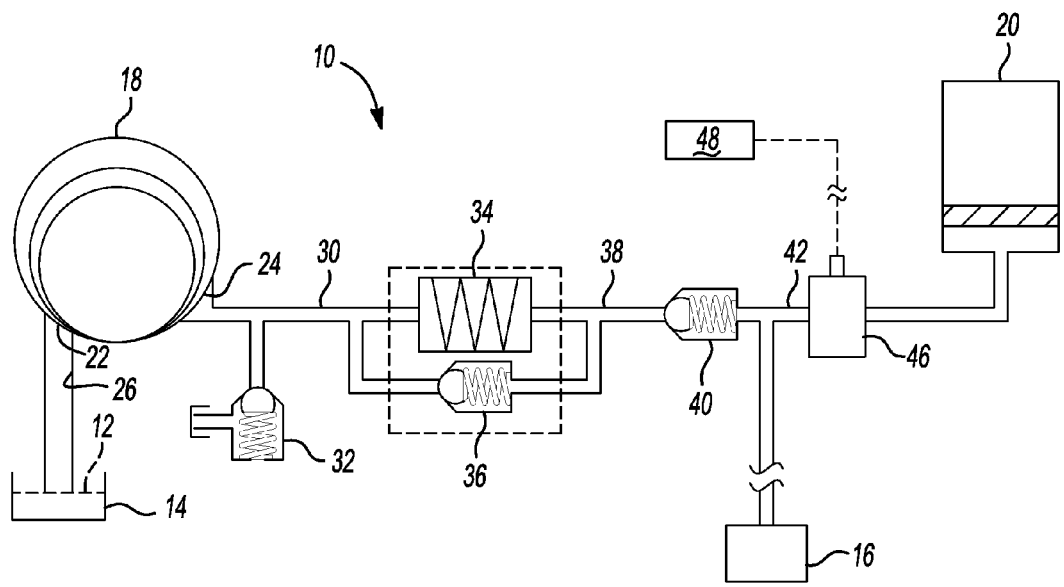
FIG. 1 is a schematic diagram of a portion of an exemplary hydraulic control system.

With reference to FIG. 1, a portion of a hydraulic control system is generally indicated by reference number 10. At the outset it should be appreciated that the portion of the hydraulic control system 10 shown in FIG. 1 is exemplary and that other configurations may be employed. The hydraulic control system 10 is operable to selectively engage torque transmitting devices (not shown) and to provide cooling and lubrication to a transmission (not shown) by selectively communicating a hydraulic fluid 12 from a sump 14 to a hydraulic circuit 16. The hydraulic fluid 12 is communicated to the hydraulic circuit 16 under pressure from either an engine driven pump 18 or an accumulator 20.

The sump 14 is a tank or reservoir to which the hydraulic fluid 12 returns and collects from various components and regions of the transmission. The hydraulic fluid 12 is forced from the sump 14 and communicated throughout the hydraulic control system 10 via the pump 18. The pump 18 may be, for example, a gear pump, a vane pump, a gerotor pump, or any other positive displacement pump. The pump 18 includes an inlet port 22 and an outlet port 24. The inlet port 22 communicates with the sump 14 via a suction line 26. The outlet port 24 communicates pressurized hydraulic fluid 12 to a supply line 30. The supply line 30 is in communication with a spring biased blow-off safety valve 32, an optional pressure side filter 34, and an optional spring biased check valve 36. The spring biased blow-off safety valve 32 communicates with the sump 14. The spring biased blow-off safety valve 32 is set at a relatively high predetermined pressure and if the pressure of the hydraulic fluid 12 in the supply line 30 exceeds this pressure, the safety valve 32 opens momentarily to relieve and reduce the pressure of the hydraulic fluid 12. The pressure side filter 34 is disposed in parallel with the spring biased check valve 36. If the pressure side filter 34 becomes blocked or partially blocked, pressure within supply line 30 increases and opens the spring biased check valve 36 in order to allow the hydraulic fluid 12 to bypass the pressure side filter 34.

The pressure side filter 34 and the spring biased check valve 36 each communicate with an outlet line 38. The outlet line 38 is in communication with a second check valve 40. The second check valve 40 is in communication with a main supply line 42 and is configured to maintain hydraulic pressure within the main supply line 42. The main supply line 42 supplies pressurized hydraulic fluid to the hydraulic circuit 16 and a control device 46. The control device 46 is operable to "actively" control whether the accumulator 20 is charged or discharged. For example, when the control device 46 is open, the accumulator 20 may charge or discharge based on the level of pressure supplied by the pump 18. When the control device 46 is closed, the accumulator 20 remains in either a charged or discharged state. The control device 46 may be an on/off solenoid or a pressure or flow control solenoid.

The control device 46 is electrically controlled by a control module 48. The control module 48 may be a transmission control module, an engine control module, or both, or any other type of controller or computer. The control module 48 is preferably an electronic control device having a preprogrammed digital computer or processor, control logic, memory used to store data, and at least one I/O peripheral for supplying a signal current to the control device 46.

The control device 46 is in fluid communication with the accumulator 20. The accumulator 20 is an energy storage device in which the non-compressible hydraulic fluid 12 is held under pressure by an external source. In the example provided, the accumulator 20 is a spring type or gas filled type accumulator having a spring or compressible gas that provides a compressive force on the hydraulic fluid 12 within the accumulator 20. However, it should be appreciated that the accumulator 20 may be of other types, such as a gas-charged type, without departing from the scope of the present invention. Accordingly, the accumulator 20 is operable to supply pressurized hydraulic fluid 12 back to the main supply line 42. However, upon discharge of the accumulator 20, the second check valve 40 prevents the pressurized hydraulic fluid 12 from returning to the pump 18. The accumulator 20, when charged, effectively replaces the pump 18 as the source of pressurized hydraulic fluid 12, thereby eliminating the need for the pump 18 to run continuously.

Figure 2:
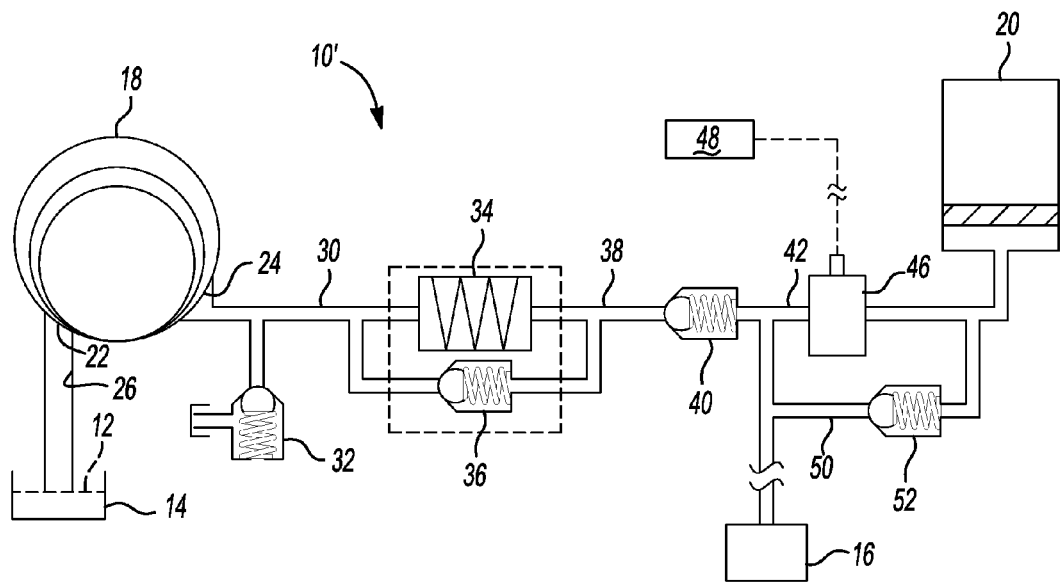
FIG. 2 is a schematic diagram of a portion of another exemplary hydraulic control system.

Turning briefly to FIG. 2, a portion of an alternate hydraulic control system is indicated generally by reference number 10'. The hydraulic control system 10' is similar to the hydraulic control system 10 shown in FIG. 1 and like components are indicated by like reference numbers. However, the hydraulic control system 10' is configured to "passively" charge the accumulator 20 rather than "actively" charge the accumulator 20. For example, a supply line 50 communicates from the main supply line 42 to a third check valve 52 disposed in parallel with the control device 46. The third check valve 52 is in communication with the accumulator 20 and is configured to maintain hydraulic pressure between the main supply line 42 and the accumulator 20. The accumulator 20 is charged when pressure from the pump 18 exceeds the bias of the third check valve 52. Discharge of the accumulator 20 occurs when the control device 46 is opened.

Figure 3:
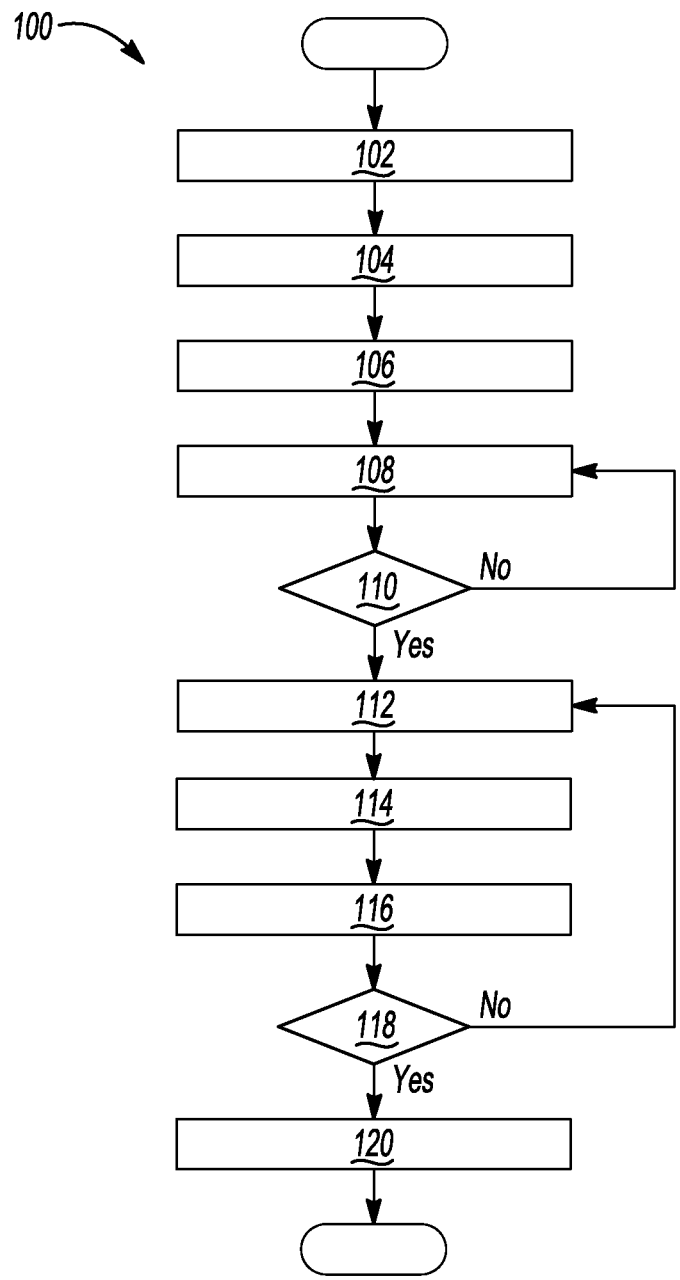
FIG. 3 is a flow chart illustrating a method of operating the hydraulic control systems of FIGS. 1 and 2 according to the principles of the present invention.

With reference to FIG. 3, and with continued reference to FIGS. 1 and 2, a method 100 for determining the charge or fill state of the accumulator 20 will now be described. The method 100 begins at step 102 where a current is supplied to the solenoid 46. In the configuration of "active" accumulator fill, the current supplied to the solenoid 46 is sufficient to open the solenoid 46. In the configuration of "passive" accumulator fill, the current supplied to the solenoid 46 is not sufficient to open the solenoid 46. At step 104 pressurized hydraulic fluid 12 is supplied to the accumulator 20 by the pump 18. The hydraulic fluid 12 is sufficiently pressurized to begin charging the accumulator 20.

Once hydraulic fluid 12 has been provided to the accumulator 20, a timer value is initialized at a reference value, such as zero, indicated at step 106. At step 108 the timer value is incremented. At step 110 the timer value is compared to a timer threshold value. The timer threshold value is a predefined value representative of a minimum amount of time that should pass while charging of the accumulator 20 occurs. The timer threshold value may be a function of a temperature of the hydraulic fluid or proportional to the size of the accumulator 20. If the timer value is less than the timer threshold value, the method 100 returns to step 108 where the timer value is incremented. If the timer value is greater than the timer threshold value, then the method 100 proceeds to step 112.

At step 112 the current supplied to the solenoid 46 is measured by the controller 48. Since the current commanded by the controller 48 has not changed, any change in the measured current is representative of a change in the forces acting on the solenoid 46. For example, as fluid pressure between the solenoid 46 and the accumulator 20 increases, the change in pressure 20 induces a change in the current in the solenoid 46 due to the pressure forces acting on the armature or valve of the solenoid 46.

At step 114 the controller 48 may optionally apply a filter to the measured current. This filter may be a low-pass, band-pass, high-pass, or other filter applied to the measured current in order to help detection by eliminating any unwanted or interfering frequency signals in the measured current.

At step 116 the characteristics in measured current over time and with respect to the commanded current is modified using one or more of several methods. In one example, the controller 48 calculates a derivative value of the measured current (i.e. the rate of change of the current). In another example, the controller 48 calculates a magnitude of the change of the measured current over time. In yet another example, the controller 48 calculates a running average of the measured current over time.

Once the measured current has been modified, the method 100 proceeds to step 118 where the modified current is compared to a threshold value. The value of the threshold value is dependent on the selected method of quantifying the measured current. Generally, however, the threshold value is determined based on learned behavior of the pressure of the hydraulic fluid acting on the solenoid 46 and the change in measured current induced by the hydraulic fluid. If the modified current is less than the threshold value, the method returns to step 112 and repeats. If, however, the modified current is greater than the threshold value, then the method 100 proceeds to step 120 where the controller 48 determines that the accumulator 20 is charged and the method 100 ends.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for determining whether an accumulator is filled to a predetermined level with a hydraulic fluid where the accumulator is in fluid communication with a solenoid, the method comprising:
commanding a current to the solenoid;
providing pressurized hydraulic fluid to the accumulator;
setting a timer to an initial value;
incrementing the timer;
determining if the timer is greater than a timer threshold value;
measuring a current to the solenoid if the timer is greater than the timer threshold value;
calculating a modified current as a function of the measured current, the timer value, and the commanded current;
comparing the modified current to a threshold; and determining that the accumulator is filled to the predetermined level if the modified current is greater than the threshold.

2. The method of claim 1 further comprising filtering the measured current.

3. The method of claim 1 wherein calculating the modified current includes calculating a rate of change of the measured current over time.

4. The method of claim 1 wherein calculating the modified current includes calculating a magnitude of change in the measured current over time.

5. The method of claim 1 wherein calculating the modified current includes calculating a running average of the measured current over time.

6. The method of claim 1 wherein the timer threshold is a function of a temperature of the hydraulic fluid.

7. The method of claim 1 wherein the timer threshold is a function of a size of the accumulator.

8. A method for determining whether an accumulator is filled to a predetermined level with a hydraulic fluid where the accumulator is in fluid communication with a solenoid, the method comprising:
   commanding a current to the solenoid;
   providing pressurized hydraulic fluid to the accumulator;
   setting a timer to an initial value;
   incrementing the timer;
   determining if the timer is greater than a timer threshold value;
   measuring a current to the solenoid if the timer is greater than the timer threshold value;
   calculating a modified current by calculating a rate of change of the measured current over time;
   comparing the modified current to a threshold; and
   determining that the accumulator is filled to the predetermined level if the modified current is greater than the threshold.

9. The method of claim 8 further comprising filtering the measured current with at least one of a high band pass, a low band pass, and a band pass.

10. The method of claim 8 wherein the timer threshold is a function of a temperature of the hydraulic fluid.

11. The method of claim 8 wherein the timer threshold is a function of a size of the accumulator.

12. A hydraulic control system comprising:
   a source of pressurized hydraulic fluid;
   an accumulator in fluid communication with the source of pressurized hydraulic fluid;
   a solenoid in fluid communication with the accumulator;
   a control module in electronic communication with the solenoid, the control module having a processor and memory for storing and executing a plurality of control logic, the plurality of control logic including:
      a first control logic for commanding a current to the solenoid;
      a second control logic for providing pressurized hydraulic fluid to the accumulator;
      a third control logic for setting a timer to an initial value;
      a fourth control logic for incrementing the timer;
      a fifth control logic for determining if the timer is greater than a timer threshold value;
      a sixth control logic for measuring a current to the solenoid if the timer is greater than the timer threshold value;
      a seventh control logic for calculating a modified current as a function of the measured current, the timer value, and the commanded current;
      an eighth control logic for comparing the modified current to a threshold; and
      a ninth control logic for determining that the accumulator is filled to the predetermined level if the modified current is greater than the threshold.

13. The hydraulic control system of claim 12 wherein the controller further includes a tenth control logic for filtering the measured current.

14. The hydraulic control system of claim 12 wherein the control logic for calculating the modified current includes calculating a rate of change of the measured current over time.

15. The hydraulic control system of claim 12 wherein the control logic for calculating the modified current includes calculating a magnitude of change in the measured current over time.

16. The hydraulic control system of claim 12 wherein the control logic for calculating the modified current includes calculating a running average of the measured current over time.

17. The hydraulic control system of claim 12 wherein the accumulator is passively charged from the source of pressurized hydraulic fluid.

18. The hydraulic control system of claim 12 wherein the accumulator is actively charged from the source of pressurized hydraulic fluid.

* * * * *